(12) United States Patent
Chochois et al.

(10) Patent No.: US 9,516,012 B2
(45) Date of Patent: Dec. 6, 2016

(54) METHOD AND SERVER OF ELECTRONIC SAFES WITH INFORMATION SHARING

(75) Inventors: Michaël Chochois, Cesson-Sevigne (FR); Guillaume Jadeau, Pont-du-Chateau (FR)

(73) Assignee: ALMERYS, Clermont Ferrand (FR)

( * ) Notice: Subject to any disclaimer, the term of this patent is extended or adjusted under 35 U.S.C. 154(b) by 1141 days.

(21) Appl. No.: 12/332,152

(22) Filed: Dec. 10, 2008

(65) Prior Publication Data

US 2009/0206988 A1   Aug. 20, 2009

(30) Foreign Application Priority Data

Dec. 10, 2007   (FR) ...................................... 07 59696

(51) Int. Cl.
*G06F 21/62* (2013.01)
*H04L 29/06* (2006.01)

(52) U.S. Cl.
CPC ....... *H04L 63/0815* (2013.01); *G06F 21/6218* (2013.01); *G06F 21/6245* (2013.01); *G06F 21/6272* (2013.01)

(58) Field of Classification Search
CPC ...... G06F 17/30; G06F 11/1076; G06F 21/72; G06F 21/79; G06F 3/0647; G06F 13/385; G06F 21/6218; G06F 21/6245; G06F 21/6272; G07C 9/00111; G07F 7/1008; G06Q 20/04
USPC ... 714/6.21, 47.2; 713/189, 176; 705/41, 44, 705/41.051; 711/163, 162, 165; 340/5.8; 902/2.9, 24, 29; 710/65; 707/201; 726/7
See application file for complete search history.

(56) References Cited

U.S. PATENT DOCUMENTS

| | | | |
|---|---|---|---|
| 6,006,333 A * | 12/1999 | Nielsen | 726/8 |
| 6,529,976 B1 * | 3/2003 | Fukuzawa et al. | 710/65 |
| 7,010,693 B1 * | 3/2006 | Lee et al. | 713/176 |
| 7,111,137 B2 * | 9/2006 | Chong, Jr. | 711/162 |
| 7,502,954 B1 * | 3/2009 | Strickland et al. | 714/6.21 |
| 7,953,948 B1 * | 5/2011 | Dyatlov et al. | 711/163 |
| 2001/0011250 A1 * | 8/2001 | Paltenghe et al. | 705/41 |
| 2005/0203885 A1 | 9/2005 | Chenevich et al. | |
| 2006/0089126 A1 * | 4/2006 | Frank et al. | 455/411 |
| 2006/0112150 A1 * | 5/2006 | Brown et al. | 707/201 |
| 2007/0250920 A1 * | 10/2007 | Lindsay | 726/7 |
| 2007/0255963 A1 * | 11/2007 | Pizano et al. | 713/189 |
| 2008/0059208 A1 * | 3/2008 | Rockfeller | G06Q 30/0245 705/14.44 |
| 2008/0294899 A1 * | 11/2008 | Gazzetta | G06F 21/6218 713/170 |
| 2011/0213940 A1 * | 9/2011 | Gladwin et al. | 711/163 |

FOREIGN PATENT DOCUMENTS

WO   WO 02/103496 A2   12/2002
WO   WO 03/009111 A2   1/2003

* cited by examiner

*Primary Examiner* — Andrew Bee
(74) *Attorney, Agent, or Firm* — Dentons US LLP

(57) ABSTRACT

A method of managing electronic safes implemented by a server on behalf of at least one user possessing at least a first electronic safe, said method comprising a step of implementing access means designed to provide said user with access, via a second safe belonging to said user, to a set of data forming part of a content accessible via the first electronic safe, said implementation step being intended to be carried out in the event of authentication of said user as the user owning the first electronic safe.

12 Claims, 1 Drawing Sheet

METHOD AND SERVER OF ELECTRONIC SAFES WITH INFORMATION SHARING

CROSS REFERENCE TO RELATED APPLICATION

This application claims the benefit of the French Patent Application No. FR 07 59696, filed on Dec. 10, 2007, which is hereby incorporated by reference as if fully set forth herein.

FIELD OF INVENTION

The present invention concerns the field of electronic safes.

BACKGROUND OF THE INVENTION

Electronic safes correspond to storage spaces, with secure access, for electronic data. They offer administrations, companies and private individuals a solution for storing, in electronic form, various content, for example pay slips, bank statements, insurance policies, photographs, etc. (see, for example, the website www.e-coffrefort.fr).

Such electronic safes are generally created, and then managed, by means of a server belonging to a trusted third party and accessible from a large number of terminals (computers, mobile telephones, with WAP or Internet connection, etc.) by the users of the electronic safes.

The electronic safe generally comprises electronic directories, called folders. When a company or an administration opens a safe for a user, it provides him with a security module, for example hardware (smart card, USB medium provided with a crypto-processor (called in particular a USB "token" or "dongle"), etc.), having means of storing in particular access data. When the user wishes to access the electronic safe, a step of authenticating the user is carried out by the server by means of the security module and a terminal adapted to communicate with the server.

The authentication step generally comprises reading the access data from the security module in order to allow authentication of the holder and authorise or not the access to an electronic safe.

Amongst the folders contained in an electronic safe, one folder is generally dedicated to the storage of personal data of the user: address and telephone number, marital status, and more generally any other personal electronic item or file he wishes to archive securely.

A user may have the benefit of several electronic safes: a safe offered by his employer, another by his bank and/or insurance company, an administration, etc.

Each time an electronic safe is created, the user therefore has a new folder dedicated to his personal data.

For example, a company E1 offers an electronic safe cf1 to one of its employees. The electronic safe is opened in the name of this employee, and the personal details of the employee are recorded in the folder "personal data".

For accessing this safe, the company has issued the employee with a smart card (or a USB medium provided with a crypto-processor) comprising the logo and name of the company, etc.

Subsequently, the employee is offered a second electronic safe cf2 by another company (his bank or insurance company) or administration E2. This second safe is also opened with the name of the employee.

At that moment, no connection exists between the two safes via the server which manages them independently of each other. The probability of the existence of a homonym, the confidential nature of the data recorded in these safes (personal data, medical data, pay slips, bank details, etc.), and the risk connected with a fraud, preclude the establishment of a link between these two safes on usual criteria such as name and personal details.

The inventors thus noted a requirement to be able to establish a link between electronic safes allocated to the same user, possibly by means of different companies or administrations, without introducing any breach in keeping the information secure.

SUMMARY OF THE INVENTION

According to a first aspect, the invention proposes a method of managing electronic safes implemented by a server on behalf of at least one user possessing at least a first electronic safe.

This method comprises a step of implementing access means designed to provide said user with access, via a second safe belonging to said user, to a set of data forming part of a content accessible via the first electronic safe, said implementation step being intended to be carried out in the event of authentication of said user as the user owning the first electronic safe.

The establishment of a link between safes makes it possible to share, between different electronic safes held by the same user, the same set of data, that is to say to allow access to this same set of data via two or more safes. The shared data are for example personal data which the user wishes to be able to access as a matter of course, at each request for access to any one of his safes.

In a variant embodiment, the implementation step is carried out following receipt by the server of a request for creation for said user of the second electronic safe. Data mutualisation is therefore performed as soon as possible. In another variant, this step is carried out following a request for access to a second electronic safe already created.

In one embodiment, the method comprises a step of authenticating said user by means of user authentication data used for authenticating said user in the event of a request for access to the first safe.

The authentication data provided are for example an electronic signature of the user indicating a secret signature key or authentication items of the user indicating a secret authentication key.

Such a method thus makes it possible to be able to establish, while limiting the risk of fraud and weakening of the security of the electronic safes, a connection between electronic safes held by the same user and to mutualise between these safes, or at least certain of them, data stored in at least one of them.

In one embodiment, the authentication step comprises implementation of strong authentication, using for example at least one key stored in a hardware medium held by the user such as a smart card or a USB medium provided with a crypto-processor, or else according to a biometric print. This measure further limits the risk of fraud and weakening of the security of the electronic safes.

In one embodiment, the method according to the invention comprises a step of allocating to each electronic safe created at least one respective security function from amongst an encryption function and/or a decryption function and/or a signature function. At least one security function allocated to the new safe is chosen equal to a security function allocated to the first safe. This allows the user to make use in the same way of the data stored in the two safes.

In one embodiment, access to a safe is a function of authentication items of the user, allocated to the user by the server. The authentication items for access to the new safe are chosen different from those chosen for access to the first safe. This allows compartmentalising of the two safes. According to a second aspect, the invention proposes a computer program comprising instructions for implementing the steps of a method according to the first aspect of the invention, during execution of the program on a computer.

According to a third aspect, the invention proposes a server for managing electronic safes on behalf of at least one user possessing at least a first electronic safe, the server comprising access means designed to provide said user with access, via a second safe belonging to said user, to a set of data forming part of a content accessible via the first electronic safe, the access means being intended to be activated in the event of authentication of said user as the user owning the first electronic safe.

Other characteristics and advantages of the invention will emerge further from a reading of the following description. This is purely illustrative and must be read with reference to the accompanying drawing in which:

DESCRIPTION OF PREFERRED EMBODIMENTS

Figure 1:
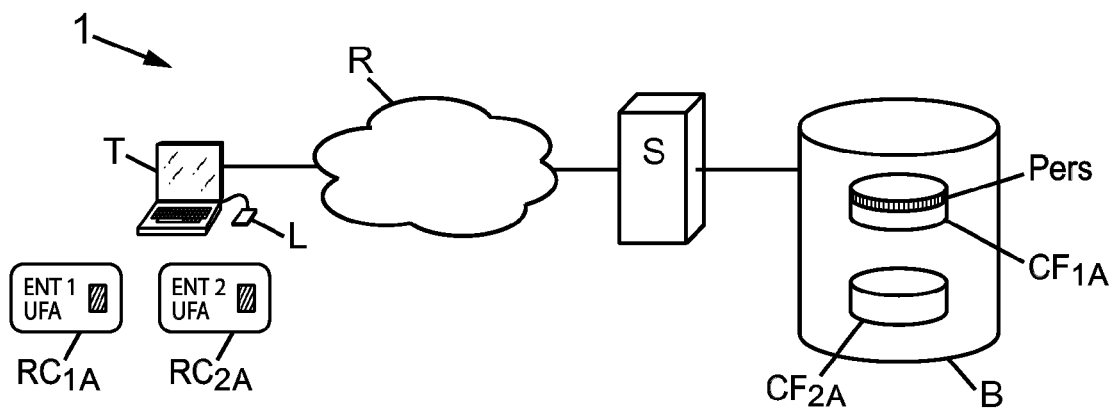
FIG. 1 depicts a system according to an embodiment of the invention.

FIG. 1 depicts a system 1 comprising a server S connected, via a communication network R, to a plurality of terminals.

The server S comprises a storage database B used in particular for storing the content of electronic safes and data necessary for managing these safes. The server S is adapted to offer users services relating to the use of electronic safes, by means of the terminals and the network R.

Amongst the terminals making it possible to access electronic safes are for example personal computers ("PCs"), mobile telephones, personal digital assistants, etc.

FIG. 1 in particular depicts the terminal T used by an individual called $UF_A$, who is an employee of the company Ent1. The terminal T is for example a PC, provided with a display screen and a keyboard. It is also equipped with an interface for reading and writing to the smart card, which will be called below a smart card reader L.

Let it be considered that the company Ent1 offers an electronic safe $CF_{1A}$ to its employee $UF_A$. The creation of an electronic safe comprises a phase of reservation by the company Ent1 of the electronic safe $CF_{1A}$ in the name $UF_A$ of the user, followed by a phase of activation of the electronic safe $CF_{1A}$ by the employee $UF_A$.

The company Ent1 has issued the employee with a hardware security module, in the present case for example a smart card $RC_{1A}$, in the colours of the company Ent1 (comprising for example its logo and name).

This smart card $RC_{1A}$ is used, in the activation phase, to activate the safe $CF_{1A}$ and configure the smart card. It is used in the phases of using the safe to access the safe $CF_{1A}$, and then consult it, and modify, delete and/or store electronic data therein.

The user $UF_A$ thus connects from the terminal T to the server S by means of the network R and indicates his wish to activate an electronic safe. The activation phase, carried out by means of the terminal T and the server S, comprises a first step according to which the user is asked to give his name and also indicate whether or not he already possesses an electronic safe. In the present case, the user answers no to the question. The activation phase then continues with insertion by the user $UF_A$ of the smart card $RC_{1A}$ into the smart card reader L.

During the phase of activation of the electronic safe $CF_{1A}$ by the user $UF_A$, the following are transmitted by the server S, and then loaded into the smart card $RC_{1A}$: an authentication certificate $CAUT_{1A}$ and an associated pair of keys (a public key and a private key), a signature certificate $CSIG_A$ and an associated pair of keys, and an encryption certificate $CCHH_A$ and the associated pair of keys.

These certificates and the associated keys dedicated to the user $UF_A$, for accessing and using the safe $CF_{1A}$ and transmitted by the server S to the smart card $RC_{1A}$, come from at least one registration and certification authority acting as trusted third party. In one embodiment, the server S itself is this trusted third party.

The server S comprises a list, in its database B, making it possible to establish the correspondences between each electronic safe, the name of its user and each of the certificates $CAUT_{1A}$, $CSIG_A$, $CCHH_A$ and associated keys.

The empty safe $CF_{1A}$ is then activated.

The user $UF_A$ now has the possibility of writing, reading and/or deleting data in storage folders provided by the electronic safe $CF_{1A}$, in particular a folder intended to store personal data.

The personal details (name, address, telephone numbers, date of birth, etc.) of the user $UF_A$ and other personal data are then supplied to the server S from the terminal T by the user $UF_A$, and then recorded in the personal data folder of the safe $CF_{1A}$.

In the present case, these personal details and personal data "Pers" supplied by the user are encrypted and signed by the terminal T using the respective encryption and signature keys stored in the smart card $RC_{1A}$, and associated with the encryption certificate $CCHH_A$ and signature certificate $CSIG_A$. They are next transmitted to the server S, and then stored in this form in the folder $CF_{1A}$.

Subsequently, the user $UF_A$ is offered a second electronic safe $CF_{2A}$ by another company (his bank or insurance company) or administration Ent2, which therefore reserves an electronic safe $CF_{2A}$ in the name $UF_A$ of the user and issues the user $UF_A$ with a security module, in the present case for example a smart card $RC_{2A}$.

Figure 2:
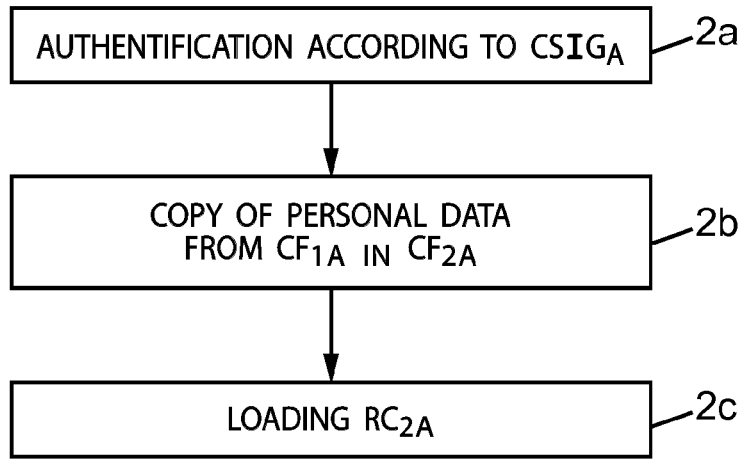
FIG. 2 depicts a method according to an embodiment of the invention.

Steps of the phase of activation of the electronic safe $CF_{2A}$ are depicted in FIG. 2.

In order to activate the safe $CF_{2A}$, the user $UF_A$ connects by means of the terminal T to the server S via the network R. There then follows a phase of dialogue via the network R between the server S and the user by means of the terminal T.

The user $UF_A$ indicates his wish to activate an electronic safe, and then enters his name. When he is asked to indicate whether he already possesses an electronic safe, the user $UF_A$ this time replies yes.

In a step 2a of the user with the server S, it is then requested by the server S that the user $UF_A$ insert the smart card associated with the electronic safe already held by the user, with a view to carrying out a step of authentication of the user with the server S on the basis of an item associated with the safe already held by the user.

This authentication is of the strong authentication type: it makes it possible to verify the identity of the user on the basis of at least two factors from amongst what he knows (password, PIN code), what he possesses (smart card, USB medium), and what he is (biometric parameter such as a fingerprint, hand, face, etc.).

In the present case, the user $UF_A$ inserts the smart card $RC_{1A}$ into the smart card reader L.

The server S chooses an unknown (comprising a random number and possible related information), encrypts the unknown using the public key associated with the authentication certificate $CAUT_{1A}$ of the user $UF_A$ and transmits it to the terminal T, requesting that the random number, increased by 1, is returned to it signed by the smart card—for example by means of an applet housed in the smart card—using the signature used for storing data in the electronic safe $CF_{1A}$.

The random number received by the terminal T is then decrypted by means of the private key of the authentication certificate $CAUT_{1A}$, then increased by 1 and signed by means of the private signature key associated with the signature certificate $CSIG_A$. These private keys are both stored in the smart card $RC_{1A}$. The terminal T transmits the random number thus decrypted, then signed, to the server S.

Using this random number increased by 1 and signed and according to the list in the database B providing the correspondences between the electronic safes, the authentication certificates and associated keys, and the names of the users, the server S carries out authentication of the user $UF_A$ and also identifies the safe $CF_{1A}$ corresponding to the signature supplied. In the event of successful authentication, the method continues to step 2b.

In a variant, instead of using the method of encryption of an unknown by the public authentication key, it is possible to carry out authentication of the user by means of a shared session key, for example of SSL/TLS type, and ensure that only the user $UF_A$ can decrypt the unknown and reply thereto according to the procedure defined.

Irrespective of the variant chosen, the aim of the authentication step is to make sure that only the user $UF_A$ owning the first safe is in a position to reply in a suitable manner. In the event of successful authentication, the following step 2b is carried out. In the contrary case, establishment of a link between the two safes does not take place and they remain compartmentalised. In particular, no access means allowing the user to access via the second safe $CF_{2A}$ at least some of the content of the first safe $CF_{1A}$ is activated or implemented.

At the step 2b, the server S implements access means designed to allow the user to access via the second safe $CF_{2A}$ at least some of the content of the first safe $CF_{1A}$. Different implementation variants are possible.

According to a first variant embodiment, the server S copies the content "Pers" from the personal data folder of the electronic safe $CF_{1A}$ into the personal data folder of the electronic safe $CF_{2A}$. Depending on the embodiment of the invention, all or some of these personal data are copied.

According to a second variant embodiment, a computer processing module of the server S establishes a logical connection between the two safes $CF_{1A}$ and $CF_{2A}$ which then share, wholly or partially, the content "Pers" of the personal data folder. Several processing procedures are conceivable for establishing this logical connection. This second variant avoids any unnecessary duplication of data.

Any other variant is also conceivable, for example through the use of electronic document management tools making it possible to select, from amongst the documents stored in a database, those that are visible and accessible by a user.

The activation phase then continues with a message from the server S addressed to the user $UF_A$ requesting insertion of the smart card of the safe to be activated into the smart card reader. The user $UF_A$ therefore replaces the smart card $RC_{1A}$ with the smart card $RC_{2A}$ in the smart card reader L.

An authentication certificate $CAUT_{2A}$ and an associated pair of keys (a public key and a private key), the signature certificate $CSIG_A$ and the associated pair of keys, and the encryption certificate $CCHH_A$ and the associated pair of keys are next transmitted by the server S, and then loaded into the smart card $RC_{2A}$.

The user $UF_A$ can then carry out storage of electronic data in the electronic safe $CF_{2A}$.

Upon subsequent requests for access to the safe $CF_{iA}$ (i=1 or 2), the user $UF_A$ will connect to the server S, and will then insert his smart card $RC_{iA}$ into the smart card reader L. Once the server S has actually authenticated the user $UF_A$ after a phase of authentication on the basis of the authentication certificate $CAU_{iA}$, the user $UF_A$ can carry out storage of new electronic data, and/or consultation, modification or deletion of data already stored.

In the embodiment described here, the server S carries out strong authentication of the user using his signature. In one embodiment, authentication is carried out using the authentication key associated with the authentication certificate $CAUT_{1A}$.

In the described embodiment of step 2a, strong authentication is carried out in particular using a hardware medium (here a smart card) held by the user. In another embodiment, it is carried out using a biometric item (for example a fingerprint) of the user used for accessing the safe $CF_{1A}$ already opened or for signing the data to be stored in this safe, said user presenting a given finger to a reader connected to the terminal for comparison of the print thus captured with a print recorded in a database associated with the server with a view to authenticating the user.

In the embodiment described, compartmentalisation between the safes $CF_{1A}$ and $CF_{2A}$ is guaranteed through the use of distinct authentication certificates, each serving to unlock the access to one of these safes.

In the embodiment described, the signature and encryption certificates and keys associated with the two safes $CF_{1A}$ and $CF_{2A}$ are identical. The signed and/or encrypted data contained in these safes are thus directly usable by both smart cards of the user.

In another embodiment, the signature and encryption certificates and keys associated with the two safes $CF_{1A}$ and $CF_{2A}$ are chosen to be different by the server, which has the effect in particular of increasing the compartmentalisation between the two safes. In yet another embodiment, in at least one of the smart cards, there is no storage of signature and/or encryption keys, that is to say the data stored in the electronic safe associated with this smart card are not encrypted and/or not signed.

In one embodiment, a hardware security module such as a smart card or a USB medium provided with a cryptoprocessor is replaced by a software security module such as a USB key or software files.

In one embodiment of the invention, establishment of a link between two electronic safes is performed a posteriori, that is to say even though the two safes have already been created independently.

In this case, in one embodiment, the user is asked to insert successively, with a view to establishment of a link between two safes, the two smart cards associated with these two respective safes and he is authenticated strongly using these two media, for example using his authentication certificates $CAUT_{1A}$, $CAUT_{2A}$ and/or signature certificates $CSIG_{1A}$, $CSIG_{2A}$. A link can then be established between the two safes, using logical connections between these two safes in the storage database B, according to two embodiments.

In the first embodiment, all the encryption and/or signature certificates and the associated pairs of keys are shared between the smart cards $RC_{1A}$ and $RC_{2A}$ by performing an update of the content of the smart cards. Only the authentication certificates remain specific to each smart card, namely the certificate $CAUT_{1A}$ for the smart card $RC_{1A}$ and the certificate $CAUT_{2A}$ for the smart card $RC_{2A}$. In this case, all the personal information is accessible and modifiable irrespective of the authentication medium used. The use of encryption and/or signature certificates during exchanges of data between the user and the server S is then supervised by the server S according to the information storage areas.

In the second embodiment, no modification of the content of the smart cards is carried out and the certificates and pairs of keys installed on one of the smart cards are completely distinct from the certificates and pairs of keys installed on the other smart card. The data in the safe $CF_{1A}$ are accessible for reading/writing when the user uses his smart card $RC_{1A}$ and accessible for only reading when the user uses his smart card $RC_{2A}$. Conversely, the data in the safe $CF_{2A}$ are accessible for reading/writing when the user uses his smart card $RC_{2A}$ and accessible for only reading when the user uses his smart card $RC_{1A}$.

The following limitation should be noted: the data encrypted by virtue of an encryption certificate and pair of keys of one smart card cannot be decrypted/read when the user accesses his safe using the other smart card. "Transencryption" solutions can then be proposed according to implementations already known.

All or some of the steps implemented by the terminal are performed in one embodiment following the execution of computer program instructions on calculation means of the terminal.

Similarly, all or some of the steps implemented by the server are performed in one embodiment following the execution of computer program instructions on calculation means of the server.

The present invention thus makes it possible to make a connection between different safes belonging to the same user, whilst safeguarding the high level of security required. It consists of allowing access to the same set of data via any one of the connected safes.

This connection is performed on the condition of authentication of the user owning the safes to be connected. This authentication is performed by means of authentication data, these data being for example data giving access to a safe already held by the user, or data giving access to the content of this safe (decryption), or any other authentication data making it possible to authenticate this user as the user owning the safes to be connected.

These authentication data are obtained for example by means of a cryptographic resource: the smart card $RC_{1A}$ or, in other embodiments, a USB medium provided with a crypto-processor to be inserted in a port, or else a biometric print to be validated.

This establishment of a link makes it possible in particular to supply a new safe with the personal data recorded in the safe protected by the cryptographic resource inserted. These personal data are thus mutualised and do not require a new entry on the part of the user.

What is claimed is:

1. A method of managing electronic safes implemented by a server on behalf of at least one user possessing at least a first electronic safe, said method comprising:
   a step of implementing access means designed to provide said user with access, via a second safe belonging to said user, to a set of data forming part of a content accessible via the first electronic safe, said access requiring an authentication of said user as a user to whom said second safe belongs,
   wherein said step of implementing access means being intended to be carried out in the event of authentication of said user as the user owning the first electronic safe,
   wherein the first safe and second safe comprise storage space, and
   wherein the first safe and second safe only contain encrypted data and said user is able to decrypt said data by a decryption process.

2. The method of claim 1, wherein said step of implementing access means is carried out following receipt by the server of a request for creation for said user of the second electronic safe.

3. The method of claim 1, further comprising:
   a step of authenticating said user by means of user authentication data used for authenticating said user in the event of a request for access to the first safe.

4. The method of claim 3, wherein the authentication step comprises implementation of strong authentication.

5. The method of claim 3, wherein, during the authentication step, the server receives authentication data that are a function of at least one key stored in a hardware cryptographic resource allocated to the user, and/or biometric data of the user.

6. The method of claim 1, further comprising:
   a step of allocating to each electronic safe at least one respective security function from amongst an encryption function and/or a decryption function and/or a signature function, at least one security function allocated to the second safe being chosen equal to a security function allocated to the first safe.

7. The method of claim 1, wherein access to an electronic safe is a function of authentication items of the user, allocated to the user by the server and according to which the authentication items for access to the second electronic safe are chosen different from those for access to the first electronic safe.

8. A non-transitory computer program product comprising a computer readable medium, having stored thereon a computer program comprising instructions for implementing, during execution of said program on a computer, by a server on behalf of at least one user possessing at least a first electronic safe, access means designed to provide said user with access, via a second safe belonging to said user, to a set of data forming part of a content accessible via the first electronic safe, said access requiring an authentication of said user as a user to whom said second safe belongs, wherein said step of implementing access means is intended to be carried out in the event of authentication of said user as the user owning the first electronic safe, wherein the first safe and second safe comprise storage space, and wherein the first safe and second safe only contain encrypted data and said user is able to decrypt said data by a decryption process.

9. A server for managing electronic safes on behalf of at least one user possessing at least a first electronic safe, the server comprising:
   access means designed to provide said user with access, via a second safe belonging to said user, to a set of data forming part of a content accessible via the first electronic safe, said access requiring an authentication of said user as a user to whom said second safe belongs, wherein said access means being intended to be activated in the event of authentication of said user as the user owning the first electronic safe, wherein the first safe and second safe comprise storage space, and wherein the first safe and second safe only contain encrypted data and said user is able to decrypt said data by a decryption process.

10. The server of claim 9, further comprising:

means for carrying out strong authentication on receipt of identification data.

11. The server of claim 9, further comprising:

means for allocating to each electronic safe at least one security function associated with at least one respective key from amongst an encryption function and/or a decryption function and/or a signature function, said means being adapted to also allocate to the new electronic safe the security function and the associated key assigned to the first electronic safe.

12. The server of claim 9, wherein access to an electronic safe is a function of authentication items of the user allocated to the user by the server, said server being adapted to allocate to the user authentication items for access to the new electronic safe different from those allocated to the user for access to the first electronic safe.

* * * * *